July 14, 1970 R. O. GIBSON 3,520,070
AIRCRAFT FLIGHT SIMULATOR
Filed Sept. 23, 1968 3 Sheets-Sheet 1
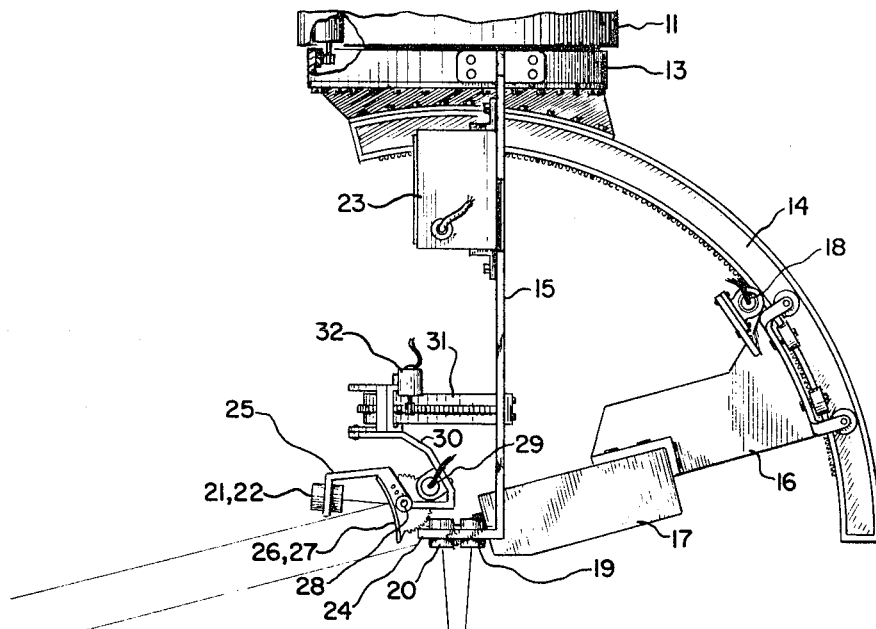
Fig. 3
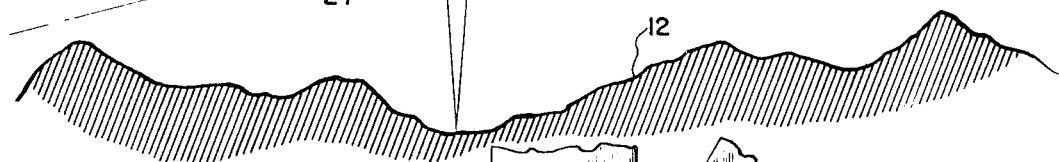
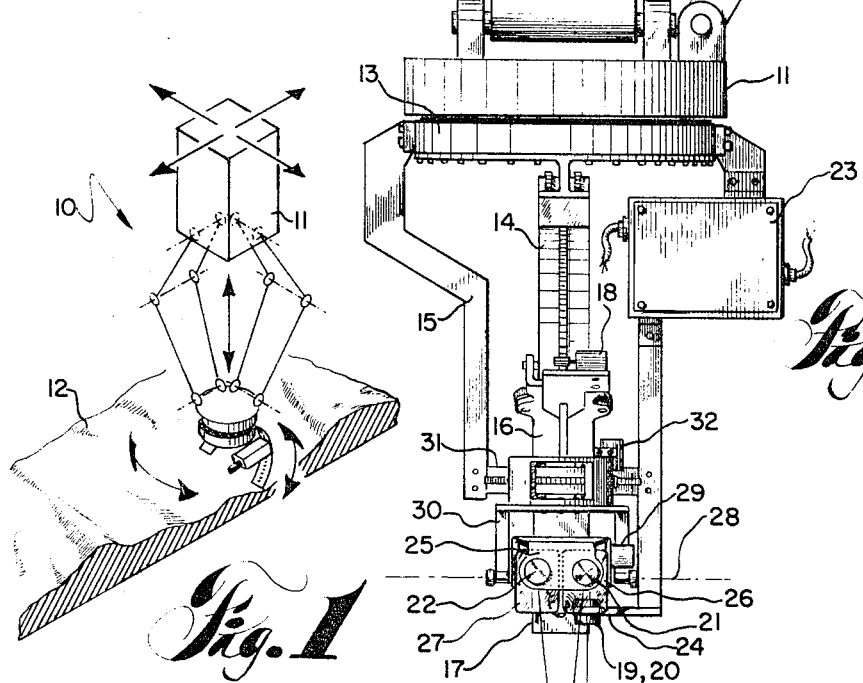
Fig. 2
Fig. 1
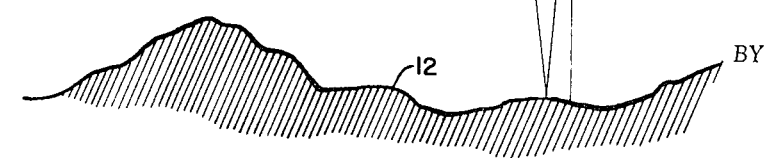
INVENTOR.
RICHARD O. GIBSON
BY
ATTORNEY

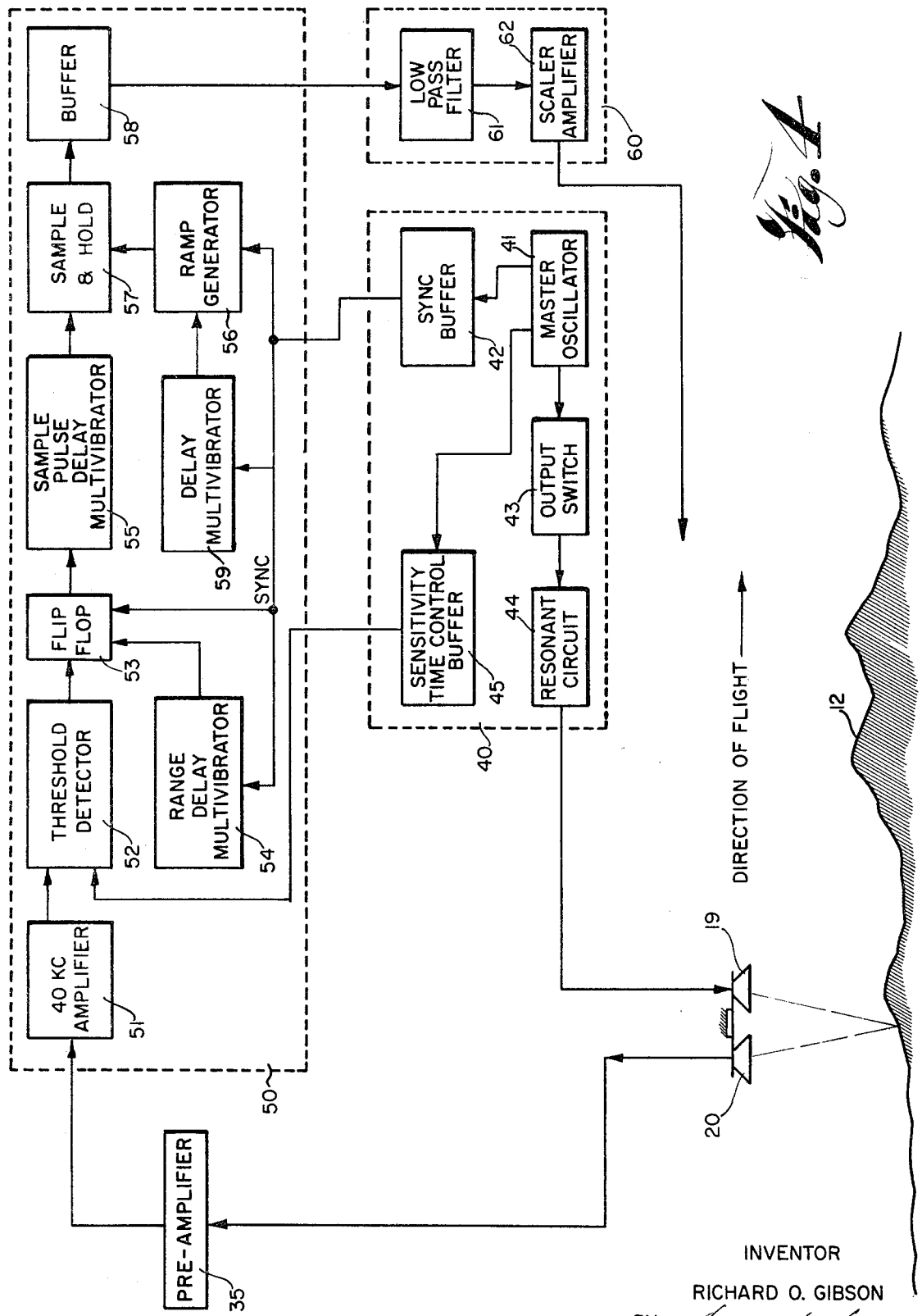

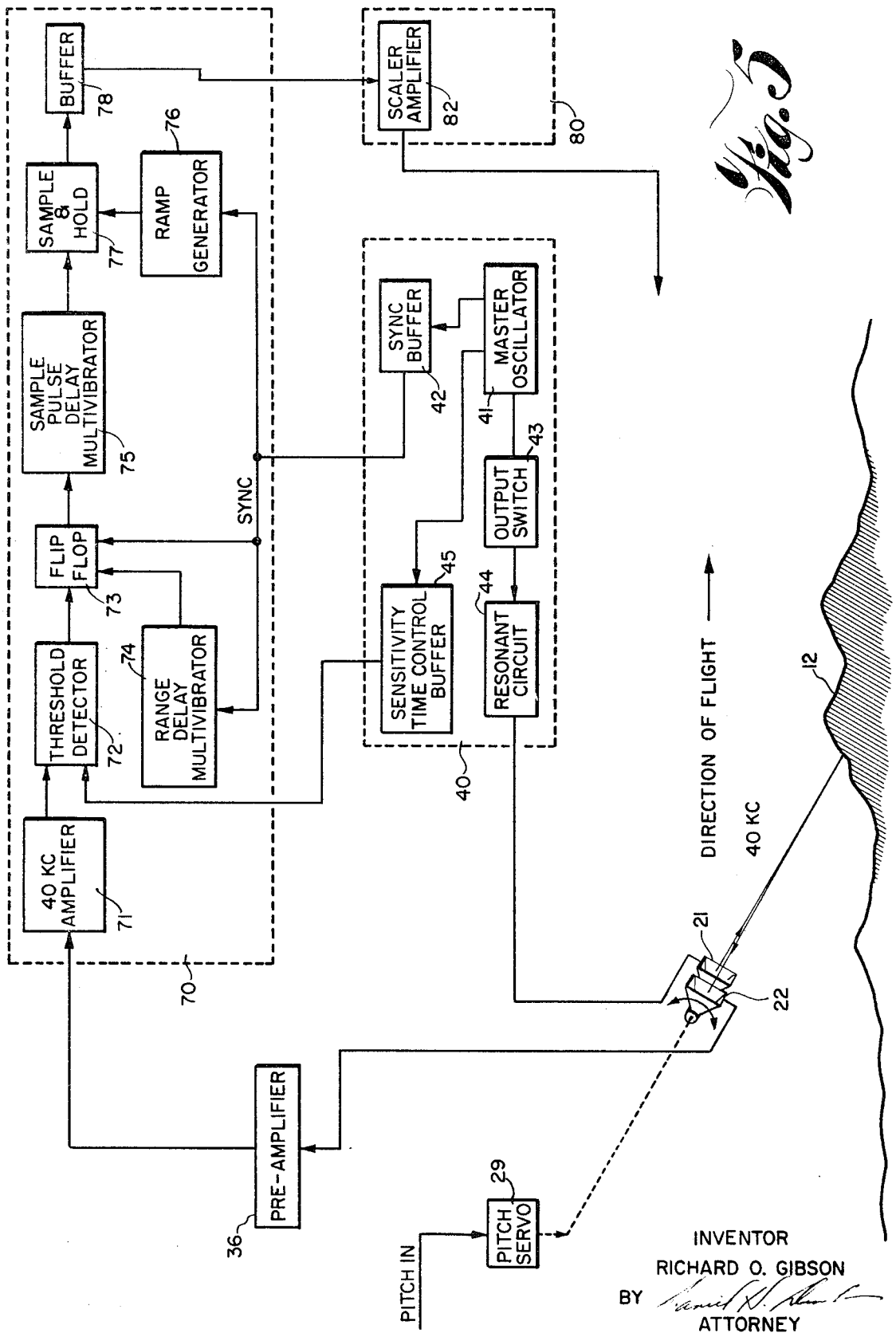

United States Patent Office 3,520,070
Patented July 14, 1970

3,520,070
AIRCRAFT FLIGHT SIMULATOR
Richard O. Gibson, Westerville, Ohio, assignor to
North American Rockwell Corporation
Filed Sept. 23, 1968, Ser. No. 761,609
Int. Cl. G09b 9/08
U.S. Cl. 35—12                                5 Claims

ABSTRACT OF THE DISCLOSURE

An aircraft flight simulator system having a vidicon camera transport is provided with prescribed ultrasonic transducers at its sensor head and with cooperating signal processing circuit means. The apparatus is operated in viewing relation to a terrain model, directs sound waves to the model, receives reflected sound waves, and processes the received sound waves into range signals which simulate terrain clearance information derived from aircraft radar equipment.

SUMMARY OF THE INVENTION

The instant invention has application to an aircraft flight simulator system having a conventional vidicon camera transport head that is controllably moved in several degrees of freedom relative to a terrain model. The vidicon camera transport head of the system is provided with altitude and forward range sets of ultrasonic transducers. The transducers of the altitude set are mounted in a generally vertical direction and generate and receive sound wave signals that are subsequently processed into scaled altitude information. The transducers of the forward range set also generate and receive sound wave signals but are mounted in and additionally oscillated relative to a forward-locking direction for the purpose of developing scaled forward range information. Signal processing circuits are incorporated in the apparatus for converting the reflected sound wave signals received at the transducer sets from the terrain model into coordinated altitude and forward range electrical signals for subsequent use as simulated aircraft radar terrain clearance information.

DESCRIPTION OF THE DRAWINGS

FIG. 1 is a schematic perspective view of a conventional aircraft flight simulator system transport head and terrain model arrangement to which the present invention has application;

FIGS. 2 and 3 are forward and side elevational views, respectively, of the arrangement of FIG. 1 having the apparatus of this invention incorporated therein;

FIG. 4 is a schematic functional block diagram illustrating the signal processing utilized in the instant invention to develop scaled altitude information; and FIG. 5 is a schematic functional block diagram illustrating the signal processing utilized in the instant invention to develop scaled forward range information.

DETAILED DESCRIPTION

The aircraft flight simulator apparatus arrangement 10 illustrated schematically in FIG. 1 includes a camera transport 11 and a terrain model designated 12. The head element 13 of transport 11 has four degrees of freedom of movement relative to model 12 as indicated by the added directional lines. Three of the degrees of freedom of motion are linear and along conventional coordinate axes. The other designated degree of freedom of movement is angular relative to a vertical axis and corresponds to aircraft yaw movement. Terrain model 12 in a typical installation is scaled at a ratio such as 1:3000 relative to earth to simulate actual features of the earth's surface. Model 12 also usually includes scaled details of superimposed man-made structures.

As shown in FIGS. 2 and 3, head element 13 carries a camera assembly support 14 and a terrain clearance simulator assembly support 15. Support 14 is arcuate in form and carries movable camera mounting plate 16 having the conventional video camera 17 secured thereto. Electrical motor 18 is selectively operable in response to signals from a simulator system control (not shown) to move mounting plate 16 and camera 17 angularly relative to support 14 and head element 13. The camera movement obtained by motor 18 basically corresponds to aircraft pitch movement. Controls for the flight simulator system to obtain movement in the several directions or degrees of freedom are conventional and do not form a part of the instant invention. No provision for roll movement is incorporated in apparatus 11 of FIG. 1 but such may be developed in known manners if required.

Assembly support 15 associated with the instant invention carries an altitude transducer set comprised of matched crystal transducers 19 and 20, a forward range transducer set comprised of matched crystal transducers 21 and 22 and cooperating signal processing circuits located within attached housing 23. Transducers 19 and 20 are mounted on arm 24 and are carried in a fixed position relative to support 15 and head element 13. Transducer 19 functions as a transmitter and radiates sound wave energy along its radiation axis in the direction of terrain model 12. Sound wave energy reflected from terrain model 12 is directed to transducer 20 which functions as a receiver. It is preferred that transducers 19, 20 be mounted at an elevational level corresponding to the elevational level maintained by the lens component of vidicon camera 17 when moved relative to support 14.

As shown best by FIG. 3, transducers 21, 22 of the forward range transducer set are mounted on support 15 in a relatively movable manner. First, transducers 21, 22 are fixedly supported by arm 25 in cooperating relation to paired parabolic reflectors 26, 27. Such sub-assembly is rotatably secured to sub-support member 30 and arranged for rotation about a horizontal transverse axis 28 by motor 29 also secured to sub-support 30. Sub-support 30 in turn is carried by semi-circular sub-support 31 and is moved relative to such sub-support 31 in yaw directions by motor 32. Motor 29 is incorporated in a pitch servo loop and functions to generally maintain the direction of the sound wave beam radiated by transmitter transducer 21 and reflector 26 in a basic direction approximately parallel to the viewing axis of camera 17 and to additionally oscillate transducers 21, 22 and reflectors 26, 27 vertically relative to such basic direction during terrain clearance simulator operation. In one actual embodiment of the invention, transducers 21, 22 were mounted on arm 31 and with reflectors 26, 27 so that their projected radiation axes defined an included angle B of approximately 6°. During terrian clearance simulator operation, the beam was oscillated in pitch 15° up and 30° below the basic direction parallel to the viewing axis of camera 17 at a frequency of 1 cycle per second. The apparatus construction features for obtaining yaw movement through motor 32 and sub-support 31 are not required in all instances and in some applications the position of transducers 21, 22 may be fixed in a manner that precludes rotation about a vertical axis independently of support member 15.

The electronics required for generating sound wave signals at transducers 19 and 21 and for processing the reflected sound wave signals received at transducers 20 and 22 into simulated terrain clearance information of the type derived from aircraft radar equipment are provided in the invention generally within housing 23. Suitable circuits for accomplishing the functions are illustrated schematically in FIGS. 4 and 5. As shown by FIG. 4, the important circuits for developing simulated clearance altitude information comprise a transmitter board 40, an altitude range information board 50, and a scaler board 60. Transmitter board 40 functions to drive crystal transmitter transducer 19. Master oscillator circuit 41 is of a relaxation type operating at approximately 60 cycles per second to establish the system pulse repetition frequency. The negative output pulse of circuit 41 is normally inverted and amplified by synchronization buffer circuit 42 for use as a master synchronization pulse in range information board 50. The positive output pulse of master oscillator circuit 41 activates output switch circuit 43 to cause the excitation of combined transmitter transducer 19 and resonant circuit 44 by a power supply circuit (not shown). In one embodiment of the invention circuit 44 is resonant at a frequency of approximately 40 kc. In addition, an output pulse of master oscillator circuit 41 is amplified and shaped at sensitivity time control buffer circuit 45 for use as a control in the processing of range information by board 50 as hereinafter described.

A conventional pre-amplifier circuit 35 with high input impedance and low output impedance is coupled to receiver transducer 20 of FIG. 4 and normally includes an appropriate filter matched to the frequency established by resonant circuit 44. Board 50 accepts the receiving transducer output in an amplified but unprocessed form and functions to develop an analog output signal that is proportional in voltage amplitude to the time delay that exists between a pulse transmitted and received by the transducer components of the altitude transducer set. Amplifier 51 is conventional and amplifies the output of pre-amplifier circuit 51 to a usable level. Its output is provided as one input to threshold detector circuit 52. The other input to conventional threshold detector circuit 52 is the sensitivity time control signal developed in circuit 45 of transmitter board 40 as previously described. The control signal from circuit 45 functions to reduce the sensitivity of threshold detector 52 in response to received echo signals representative of relatively short altitude ranges. It does this by decreasing the threshold level as a function of time beginning with the time of initial transmission of each basic transmitter board pulse. Flip-flop circuit 53 produces an output pulse whose time duration is proportional to detected echo delay or altitude range. Circuit 53 functions in a conventional manner and is set by the synchronization pulse from sync buffer circuit 42 and re-set by the first pulse from threshold circuit 52. An inhibit pulse is developed in one-shot circuit 54 in sychronization output of circuit 42 and provides a delay, such as 225 microseconds, that eliminates the possibility of immediate re-set of flip-flop circuit 53 by any transmitted pulse feed-through and also acts to establish the system minimum detectable altitude.

In the preferred circuit arrangement of FIG. 4, the range pulse output of flip-flop circuit 53 is subsequently coupled to one-shot circuit 55 and activates that circuit on the range pulse output trailing edge. The pulse output of circuit 55, preferably of fixed but limited duration, e.g., 100 microseconds, is therefore delayed from the synchronization signal produced in circuit 42 by the range pulse time. In developing the analog output signal of board 50, an integrator circuit 56 is utilized for developing a ramp voltage. Circuit 56 is set (re-set) by the output signal from circuit 42. A sample-hold circuit 57 is also provided on board 50. It is "turned on" by the short (e.g., 100 microsecond) duration sampling pulse from multivibrator circuit 55 and therefore conducts only at the time the reflected sound wave is received at transducer 20. The charge on the capacitor in circuit 57 that is coupled to the ramp generator 56 therefore is a sample voltage value proportional to position of the received pulse in the period of the ramp output of generator 56. Buffer circuit 58 is a voltage amplifier circuit that amplifies the output of sample-hold circuit 57 for subsequent use in scaler board 60. Altitude range information board 50 may be provided with a diode function generator delay multivibrator circuit 59 that functions to selectively modify the slope of the ramp voltage generated in integrator circuit 56 in its initial portion to obtain compensation at low clearance altitude values for any non-linearity attributed to the lateral spacing of transducers 19 and 20.

The arrangement of FIG. 4 also includes a scaler board 60 that functions to convert the output voltage of buffer amplifier 58 into a usable signal such as for driving a conventional computer connected to the invention. Such scaler board may include a low band-pass filter 61 for optimized coupling in the case of a loss of signal between transducers 19 and 20. Scaler amplifier circuit 62 is of conventional construction and functions to obtain the desired signal gain, such gain being selected to supplement any gain actually obtained in filter circuit 61.

The apparatus arrangement for deriving forward-looking range information from crystal transducers 21 and 22 in the invention is shown in FIG. 5. Such arrangement is similar to the arrangement of FIG. 4 for obtaining clearance altitude information except that the pre-amplifier that operates on the receiver transducer 22 output is designated 36. The boards that process the amplified received signal into a simulated aircraft radar equipment forward-looking range signal are further-identified as forward-looking range information board 70 and scaler board 80. The transmitter board 40 for driving transducer 21 normally is the same in construction and operation as the transmitter board described in connection with FIG. 4.

The circuits of board 70 are constructed and operated in the same manners as the circuits having the corresponding functions described in connection with signal processing in board 50. However, it is possible to increase the delay value established by multivibrator circuit 74 over that obtained in circuit 54 (e.g., to 2 milliseconds) since the minimum range requirements for forward-looking range information are generally greater than the minimum requirements for altitude clearance range information. Also, scaler board 80 may include only a scaler amplifier 82 similar to amplifier 62 since the problem of high-frequency filter-through may be non-existent at the greater forward-looking ranges. Also, the pulse output from circuit 75 in some instances has been utilized as the basis of a control signal that assures that the output of the system (board 80) is correlated to particular pitch-scanning by transducer set 21, 22. In such instances wherein the range signal is to be a simulation only in connection with upward pitch sweeping by transducer set 21, 22 about axis 28, the signal from circuit 75 activates a multivibrator circuit (not shown) that forms a "read" signal having a duration corresponding approximately to the period of the system basic pulse repetition frequency.

I claim:
1. In an aircraft flight simulator system, in combination:
(a) Terrain model means having three-dimensional earth surface features simulated at substantially reduced scale;
(b) Transport head means movable linearly in altitude and forward directions above said terrain model means earth surface features;
(c) Vidicon camera means having a viewing axis movable angularly in a pitch direction relative to said terrain model means and being mounted on said transport head means with said viewing axis in viewing relation to said terrain model means earth surface features;
(d) Altitude range sensor means consisting of paired transmitter and receiver transducer elements mounted on said transport head means in fixed altitude relation relative to said vidicon camera means;
(e) Forward range sensor means consisting of paired transmitter and receiver transducer elements mounted on said transport head means in fixed altitude relation and in movable pitch relation relative to said vidicon camera means; and
(f) Circuit means energizing each of said sensor means transmitter transducer elements to radiate ultrasonic energy pulses and processing reflected ultrasonic energy received by said sensor means receiver transducer elements from said terrain model means earth surface features into scaled altitude clearance and forward range clearance signals;
said altitude range sensor means paired transducer elements being oriented to radiate and receive ultrasonic energy in and from generally vertical directions, and said forward range sensor means paired transducer elements being oriented to radiate and receive ultrasonic energy in and from directions generally parallel to said vidicon camera means viewing axis.

2. The invention defined by claim 1, wherein said circuit means energizes each of said sensor means transmitter transducer elements to radiate ultrasonic energy pulses at a pulse repetition frequency of approximately 60 pulses per second.

3. The invention defined by claim 2, wherein said circuit means energizes each of said sensor means transmitter transducer elements to radiate ultrasonic energy pulses at a carrier frequency of approximately 40 kilocycles per second.

4. The invention defined by claim 1, wherein said simulator system is provided with servo motor means for moving said forward range sensor means relative to said vidicon camera means in a pitch direction, said servo motor means moving said forward range sensor means angularly throughout an angular range extending 15° above and 30° below an axis that is generally parallel to said vidicon camera means viewing axis.

5. The invention defined by claim 4, wherein said servo motor means moves said forward range sensor means throughout said angular range at a rate of approximately one complete cycle per second.

References Cited

UNITED STATES PATENTS 3,412,481   11/1968   Flower et al. _____ 35—12

EUGENE R. CAPOZIO, Primary Examiner

P. V. WILLIAMS, Assistant Examiner